(12) United States Patent
Meissner et al.

(10) Patent No.: US 11,452,912 B2
(45) Date of Patent: Sep. 27, 2022

(54) SYSTEM AND METHOD OF CONTINOUSLY TRACKING AT LEAST ONE COMPETITOR ON AN ATHLETICS TRACK

(71) Applicant: SWISS TIMING LTD, Corgémont (CH)

(72) Inventors: Andreas Meissner, Leipzig (DE); Christian Voelker, Luetzen-Kreischau (DE)

(73) Assignee: SWISS TIMING LTD., Corgemont (CH)

( * ) Notice: Subject to any disclaimer, the term of this patent is extended or adjusted under 35 U.S.C. 154(b) by 96 days.

(21) Appl. No.: 16/994,987

(22) Filed: Aug. 17, 2020

(65) Prior Publication Data

US 2021/0077858 A1 Mar. 18, 2021

(30) Foreign Application Priority Data

Sep. 18, 2019 (EP) ..................................... 19197982

(51) Int. Cl.
*G06K 7/10* (2006.01)
*A63B 24/00* (2006.01)
*G01S 19/48* (2010.01)

(52) U.S. Cl.
CPC .......... *A63B 24/0021* (2013.01); *G01S 19/48* (2013.01); *A63B 2024/0025* (2013.01); *A63B 2220/31* (2013.01); *A63B 2220/40* (2013.01); *A63B 2220/836* (2013.01); *A63B 2225/50* (2013.01)

(58) Field of Classification Search
CPC .... A63B 2024/0025; A63B 2024/0028; A63B 2225/54; A63B 24/0021; A63B 2220/12; A63B 2220/62; G01S 13/765; G01S 13/878; G01S 19/19; G01S 19/49; G01S 2205/08; G01S 2205/09; G01S 5/14;
(Continued)

(56) References Cited

U.S. PATENT DOCUMENTS

2014/0364973 A1 * 12/2014 O'Hagan .................. G06N 5/02
700/91
2015/0375083 A1 12/2015 Stelfox et al.

FOREIGN PATENT DOCUMENTS

WO 03/051050 A1 6/2003

OTHER PUBLICATIONS

European Search Report for EP 19 19 7982 dated Feb. 21, 2020.

* cited by examiner

Primary Examiner — Lawrence S Galka
(74) Attorney, Agent, or Firm — Sughrue Mion, PLLC

(57) ABSTRACT

A system and method for continuously tracking a competitor on an athletics track, including: a wireless transmitter operable to wirelessly submit a query provided with a timestamp, a wearable transponder attachable to the competitor, and configured to receive the query, to generate a transponder specific response and to wirelessly transmit the response, stationary receivers distributed across or around the athletics track. Each of the stationary receivers is configured to receive the transponder specific response and to determine a runtime, which is indicative of a point in time relative to the timestamp at which the transponder specific response has been received by the respective stationary receiver. A processor is connected to the stationary receivers and is configured to determine a position of the wearable transponder relative to the athletics track or relative to the stationary receivers on the basis of the runtimes received from the stationary receivers.

15 Claims, 4 Drawing Sheets

(58) Field of Classification Search
CPC .......... A61B 2562/0219; A61B 5/1113; A61B 5/6802; G07C 1/12; G07C 1/24
See application file for complete search history.

SYSTEM AND METHOD OF CONTINUOUSLY TRACKING AT LEAST ONE COMPETITOR ON AN ATHLETICS TRACK

CROSS REFERENCE TO RELATED APPLICATION

This application claims priority to European Patent Application No. 19197982.2 filed Sep. 18, 2019, the entire contents of which are incorporated herein by reference.

FIELD OF THE INVENTION

The invention concerns a system and a method for continuously tracking at least one competitor on an athletics track. The invention further relates to an athletics track equipped with a system for continuously tracking at least one competitor. Furthermore, the invention relates to a computer program configured for implementation in a processing unit of a system for continuously tracking at least one competitor on an athletics track.

BACKGROUND OF THE INVENTION

In sports competitions, in particular in the field of athletics, there is an increasing demand to gather information about competitors during a competition. Document US 2014/0169140 A1 discloses for instance a method of measuring at least one time or an elapsed time of a competitor in a sports competition via a transponder module which is personal to the competitor and accompanies the competitor throughout the competition in a measuring system. There, the personalized transponder module is activated at the start of the competition or in intermediate positions or at the finish line of the competition. For this, a transmission antenna has to be arranged in or on the ground of the track. Hence, for the implementation of such a measuring method, modifications have to be made to the athletics track.

In the field of tracking of competitors on an athletics track, it is a rising demand to obtain real-time information of at least one or numerous competitors during a competition. This information should be available in real-time and/or at arbitrary positions or within variably definable zones on or along the athletics track.

It is therefore an object of the invention to provide an improved system for continuously tracking at least one competitor on an athletics track and to provide a respective method allowing a real-time monitoring and/or real-time tracking of at least one or numerous competitors during a competition. The system and the method should be reconfigurable and should be adaptable to a large variety of different tracking or monitoring demands. Moreover, the method and the system should be integral or combinable with image processing or video processing systems. The system and method should be combinable with an available image and/or video processing hardware.

SUMMARY OF THE INVENTION

The above described drawbacks and demands are solved by a system and a method of continuously tracking at least one competitor on an athletics track, by an athletics track and by a computer program in accordance to the independent claims. Particular solutions and embodiments of the invention are subject matter of the respective dependent claims.

In one aspect, there is provided a system for continuously tracking at least one competitor on an athletics track. The system comprises at least one wireless transmitter operable to wirelessly submit a query provided with a timestamp. The wireless transmitter is typically stationary located relative to the track. It may be arranged on or along the circumference of the athletics track. The system further comprises at least one wearable transponder. The wearable transponder is attachable to the at least one competitor.

The wearable transponder may be integrated or attached to a starting number of the competitor, which is typically attached or attachable to the clothes of the competitor. The at least one wearable transponder is configured to receive the query previously submitted by the at least one wireless transmitter. The at least one wearable transponder is further configured and/or operable to generate a transponder specific response and to wirelessly transmit the response.

The system further comprises at least three stationary receivers that are distributed across or around the athletics track. Each one of the three stationary receivers is configured to receive the transponder specific response and to determine a runtime. The runtime is indicative of a point in time relative to the timestamp at which the transponder specific response has been received by the respective stationary receiver.

The system further comprises a processing unit connected to the at least three stationary receivers. The processing unit is configured to determine a position of the at least one wearable transponder relative to the athletics track or relative to the at least three stationary receivers on the basis of the runtimes received from the at least three stationary receivers.

The at least three stationary receivers may be implemented as transceivers configured to submit and to receive wireless signals to and from the at least one wearable transponder. In this regard, the at least one wireless transmitter may be integrated into one of the at least three stationary transceivers. The wireless transmitter and the at least three stationary receivers are synchronized in time. They may be mutually coupled by a wired connection. When the at least one wireless transmitter submits a query, the respective query is provided with a timestamp being indicative of the time at which the query has been transmitted by the at least one wireless transmitter. The at least one wearable transponder is configured to receive the query and to generate the transponder specific response when receiving the query. The transponder specific response is provided with a unique identifier being indicative of the at least one wearable transponder. Moreover, the at least one wearable transponder is configured to react or to respond, i.e. to transmit the response at a well-defined temporal offset after having received the query.

The response transmitted by the at least one wearable transponder is received by at least three or even more stationary receivers. Each one of these receivers is configured to detect or to determine a point of time at which the respective response has been received by the respective stationary receiver. Since the transponder specific response is indicative of the transponder identification, the receipt of the transponder specific response by at least three spatially distributed stationary receivers provides receiver specific runtimes that correlate with the distance between the transponder and the respective receiver.

The runtime as determined by each one of the at least three stationary receivers is a direct measure of the total distance from the wireless transmitter to the wearable transponder and/or from the wearable transponder to the respective stationary receiver. Since each one of the stationary receivers determines a transponder specific runtime when receiving the response transmitted by the at least one wearable transponder, the processing unit is operable to determine a position of the at least one wearable transponder by way of triangulation.

In this way, the system is enabled to provide a rather continuous and real-time tracking of at least one competitor on the athletics track when the competitor is equipped with the at least one wearable transponder.

According to a further example, the wireless transmitter is configured to generate and to submit a sequence of queries in a quasi-continuous mode. Accordingly, also the wearable transponder is configured to receive the query, to generate the transponder specific response and to wirelessly transmit the response every time a wireless query has been received.

Moreover, also the at least three or even more stationary receivers and the processing unit operate in a quasi-continuous mode thus allowing to provide a kind of a real-time tracking of the at least one wearable transponder. In this way, the momentary position of the at least one wearable transponder along or across the athletics track can be tracked and/or of monitored over time.

According to a further embodiment, the processing unit is configured to successively determine a series of positions of the at least one wearable transponder during a predefined time interval. The processing unit is further configured to derive at least one of the following states of movement of the wearable transponder on the basis of the series of positions: a velocity, an acceleration, a direction of movement and/or a rotation of the at least one wearable transponder.

The velocity, the acceleration, the direction of movement and/or a rotation of the at least one wearable transponder can be derived by comparing varying positions of the at least one transponder over time. In this way, the system is enabled to provide at least one of a velocity, and acceleration, a direction of movement and/or a rotation of the at least one wearable transponder in real time.

According to a further embodiment, the at least one wearable transponder comprises a motion sensor, such as an acceleration sensor. Signals obtained by the on-board motion sensor may be integrated into the transponder specific response. In this way, the at least three stationary receivers and the processing unit may be further configured to process signals from the motion sensor integrated in the at least one wearable transponder. In this way the precision and/or a reliability of determining or deriving of at least one of a velocity, an acceleration, a direction of movement and/or a rotation of the at least one wearable transponder as provided by the system can be substantially increased.

According to a further embodiment, the system comprises a first wearable transponder and at least one second wearable transponder. With some examples, there are provided numerous, e.g. at least 8, 16, at least 32 or even 40 or more wearable transponders, each of which being indicative of a competitor or of a movable item of the competition. Moreover, the processing unit is configured to simultaneously determine a first position of the first wearable transponder and a second position of the at least one second wearable transponder on the basis of the runtimes received from the at least three stationary receivers.

Insofar, the query as submitted by the at least one wireless transmitter can be simultaneously processed by numerous wearable transponders thus generating numerous transponder specific wireless responses. The at least three or even more stationary receivers are configured to simultaneously receive and to simultaneously process the multiplicity of transponder specific responses and to determine respective runtimes for each received transponder specific response.

In this way, the position of numerous wearable transponders can be continuously tracked and/or monitored over time.

According to a further embodiment, the processing unit is configured to determine at least one of a position, an acceleration, a direction of movement and a rotation of the first wearable transponder relative to the at least one second wearable transponder. Insofar, positional data as extracted by the processing unit in relation to a first wearable transponder can be set into a relation to positional data derived by the processing unit with regards to a second wearable transponder.

With a further example, the processing unit is configured to interpolate and/or to predict a point of time at which the at least one wearable transponder will cross a virtual line or section on or along the athletics track. In this way, numerous and arbitrarily definable sectors and/or lines can be virtually defined along or on the track and respective split times at which the wearable transponders cross the respective sector or line can be actually measured or at least interpolated.

In this way, i.e. by defining virtual sectors or split lines along the track and/or by comparing positional data of the first wearable transponder with respective positional data of an at least second wearable transponder, the system is enabled to provide intermediate times, split times, sector times at any desired position along the track. In this way continuous standings or rankings of the numerous competitors, each of which being equipped with a wearable transponder can be provided.

Hence, in real-time and during a competition, the system is able to determine which one of the competitors is in the lead and who is second, third and so on. The system is further configured to calculate and/or to derive distances between at least two competitors or groups of competitors. Moreover, the system is configured to determine a distance of an arbitrary competitor to the leading competitor. The system further provides leading time calculation between at least two competitors or groups of competitors as well as a radar view of the track to have an overview of the ongoing competition. Since the system is configured to continuously track the competitors, it may also provide a remaining distance in real-time. Moreover, it may provide a comparison of individual velocities of the competitors.

In combination with a motion sensor integrated into the wearable transponder, also acceleration data of the individual competitor can be evaluated, such as to calculate a cadence of the competitor. In a hurdle race, also a time over the hurdle can be precisely determined and calculated.

According to a further embodiment, the system also comprises a camera connected to the processing unit and being configured to capture an image or an image sequence of the athletics track. The processing unit is configured to overlay information in the image(s) as provided by the camera, which information is related to the at least one wearable transponder. The camera may comprise a video camera or television camera provided a stream of images. The processing unit is configured to overlay the information in a video signal or video stream. In this way, real-time information including positional data of individual competitors can be integrated into a video signal or into an image stream.

According to a further embodiment the processing unit is configured to label the at least one wearable transponder in the image and/or to overlay the wearable transponder with transponder related information in the image. Hence, the overlay may be virtually attached to a competitor moving in the image. For this, the camera and the image provided by the camera is or are calibrated to the geometry of the athletics track.

Typically, the processing unit and the at least three stationary receivers are synchronized and are calibrated with the camera. The mutual calibration enables a mapping, attachment and dynamic movement of all related information in the image or video signal.

The system, in particular the processing unit may comprise numerous data outputs, output interfaces that can be used for different ways of illustrating, distributing or broadcasting the positional data gathered and derived by the presently described system. The processing unit comprises at least one output interface connectable to at least one of a commentator information system, to a broadcasting system, to a video screen, to the Internet or to electronically implemented result list provided in close vicinity of the athletics track.

According to a further example, the transmitter, the at least one wearable transponder and the at least three stationary receivers wirelessly communicate in the Ultra Wideband (UWB) frequency range. Hence, the system is typically implemented by Ultra Wideband radio technology that uses very low energy level for a short range and provides high-bandwidth communication. Use of UWB radio technology for the wireless transmission of queries and transponder specific responses provides a spatial resolution for the allocation of the at least one wearable transponder in a region of only a few centimeters, typically below 20 cm, below 15 cm, below 10 cm or even below 7 cm.

According to another aspect, the invention also relates to an athletics track. The athletics track typically comprises competitor lane. The athletics track is further equipped with a system as described above. There are provided at least one wireless transmitter and at least three stationary receivers across or around the athletics track. The transmitter and the receivers are of stationary type. The athletics track is further provided with at least one or numerous wearable transponders configured to wirelessly communicate with the wireless transmitter and the stationary receivers. The athletics track is further equipped with a processing unit connected to the at least three stationary receivers.

The term positional data as used herein means an absolute or relative position of the at least one wearable transponder on or across the athletics track. Positional information also includes absolute or relative velocity, absolute or relative acceleration, direction of movement and/or an absolute or relative rotation of the at least one wearable transponder relative to one of the athletics track, the at least three stationary receivers or relative to the respective positional data of at least one second wearable transponder.

In another aspect, the invention further relates to a method of continuously tracking at least one competitor on or along an athletics track.

The method comprises the steps of attaching at least one wearable transponder to the at least one competitor, wirelessly submitting a query provided with a timestamp to the at least one wearable transponder, receiving the query by the at least one wearable transponder and generating a transponder specific response and wirelessly transmitting the transponder specific response.

The method further comprises the step of receiving the transponder specific response by at least three stationary receivers distributed across or around the athletics track and determining a runtime, wherein the runtime is indicative of a point in time relative to the timestamp at which the transponder specific response has been received by the respective stationary receiver. The method further comprises the step of determining a position of the at least one wearable transponder relative to the athletics track or relative to the at least three stationary receivers on the basis of the runtimes received from the at least three stationary receivers.

The method of continuously tracking the at least one competitor on the athletics track is typically implementable by the system for continuously tracking at least one competitor on an athletics track as described above. Insofar all features, benefits and properties as described above in connection with the system equally apply to the method; and vice versa.

In a further embodiment, the method comprises the steps of submitting a sequence of queries in a quasi-continuous or continuous mode and updating the position of the at least one wearable transponder at a sampling rate of at least 1 Hz, at least 10 Hz, at least 20 Hz, at least 50 Hz or at least 100 Hz. Implementing of a sampling rate of at least 10 Hz, at least 20 Hz or at least 50 Hz is generally sufficient to provide a quasi real-time determination of positional information of the at least one wearable transponder. In this way and when the transponder is worn by a competitor, respective real-time information of the competitor is available during the competition.

According to a further example, the method comprises the step of determining a first position of a first wearable transponder and simultaneously determining a second position of an at least second wearable transponder on the basis of the runtimes received from the at least three stationary receivers. In this way, not only one, but numerous wearable transponders and hence numerous competitors equipped with such wearable transponders can be tracked and/or monitored in real time.

According to a further embodiment, the method comprises the step of determining at least one of a position, an acceleration, a direction of movement and a rotation of the first wearable transponder relative to the at least one second wearable transponder. In this way, individual positional data obtained for each wearable transponder individually can be mutually compared in order to generate a positional ranking and/or to compare a performance of the respective competitor among each other.

According to a further embodiment, the method comprises the step of capturing an image of the athletics track and overlaying information in the image, wherein the information is related to the at least one wearable transponder. Typically, the overlay information contains positional information obtainable by the system and by the method on the basis of triangulation of numerous transponder specific responses received by respective stationary receivers.

According to another aspect, the invention further relates to a computer program that is configured for implementation in a processing unit of a system for continuously tracking at least one competitor on an athletics track. Here, the at least one wearable transponder is attachable to the competitor and the at least one wearable transponder is operable to generate a transponder specific response and to transmit the response to at least three stationary receivers in response to wirelessly receive a query that is provided with a timestamp. The at least three stationary receivers are distributed across or around the athletics track. Each one of the stationary receivers is configured to wirelessly receive the transponder specific response and to determine a runtime.

Here, the runtime is indicative of a time relative to the timestamp, at which the transponder specific response has been received by the respective stationary receiver. The computer program when executed by the processing unit comprises computer program means being operable to determine a position of the at least one wearable transponder relative to the athletics track or relative to the at least three stationary receivers on the basis of the runtimes received from the at least three stationary receivers.

Typically, the computer program is implementable or deployable in the processing unit of a system for continuously tracking at least one competitor on an athletics track as described above. Moreover, the computer program is configured to execute or to implement the above described method of continuously tracking at least one competitor on an athletics track. Insofar all features, benefits and properties as described above in connection with the system and the method equally apply to the computer program; and vice versa.

BRIEF DESCRIPTION OF THE DRAWINGS

Numerous features, properties and advantages of the system, the method, the athletics track and the computer program as described above are described in more detail by way of examples by making reference to the drawings, in which.

DETAILED DESCRIPTION OF THE INVENTION

Figure 1:
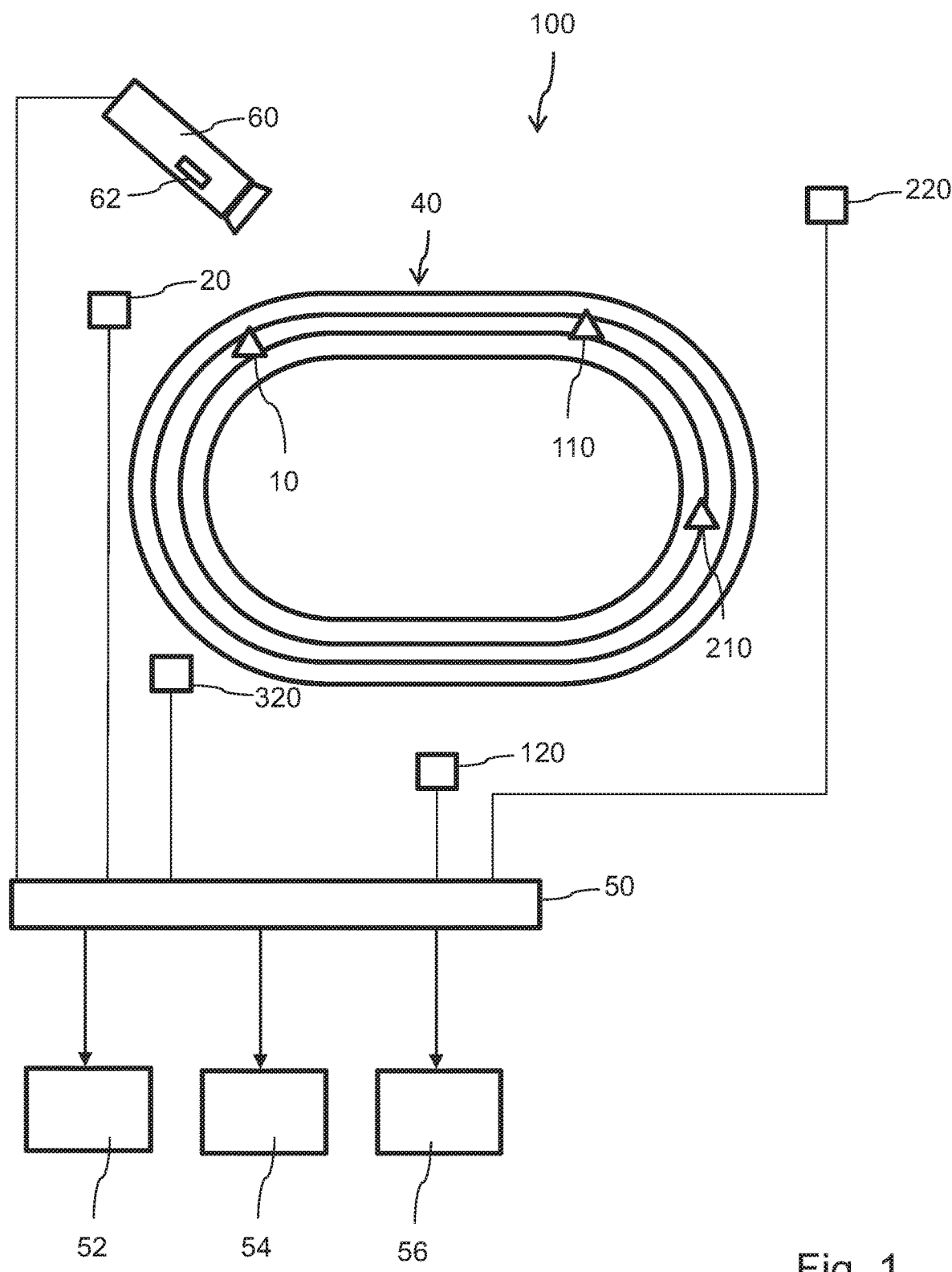
FIG. 1 schematically illustrates a system for continuously tracking at least one competitor on an athletics track, FIG. 2 schematically illustrates numerous competitors on the athletics track, FIG. 3 schematically illustrates numerous competitors in a transition zone on the athletics track, FIG. 4 schematically illustrates an image of the track with overlay information.
Figure 2:
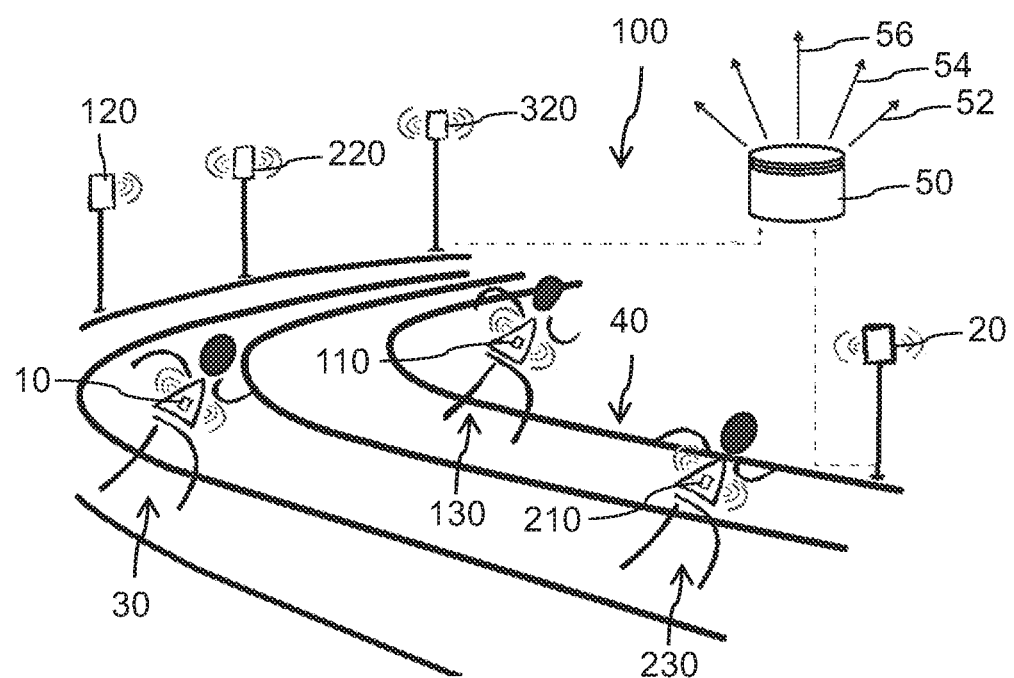
Figure 3:
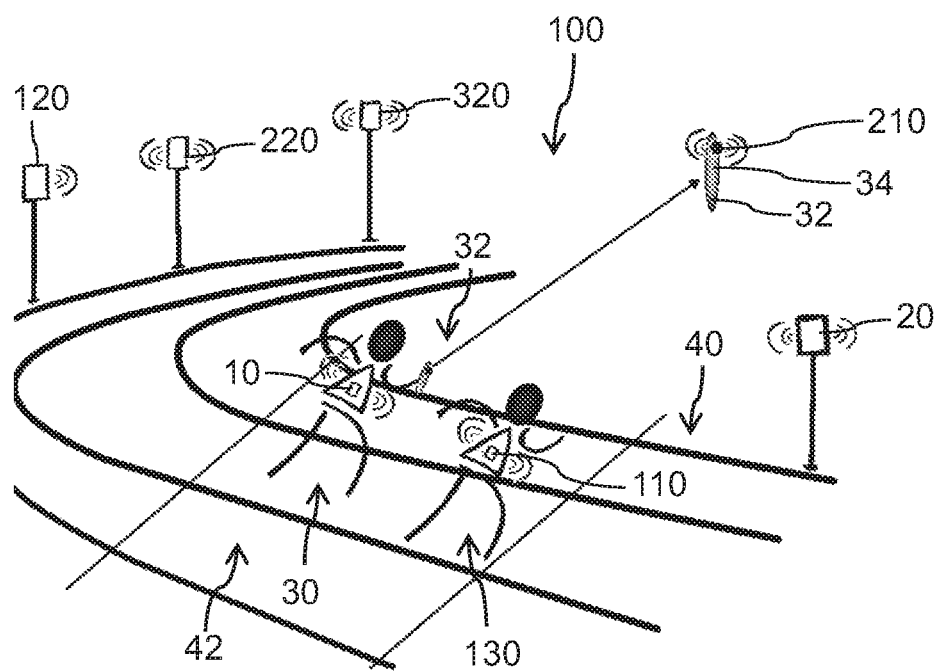
Figure 4:
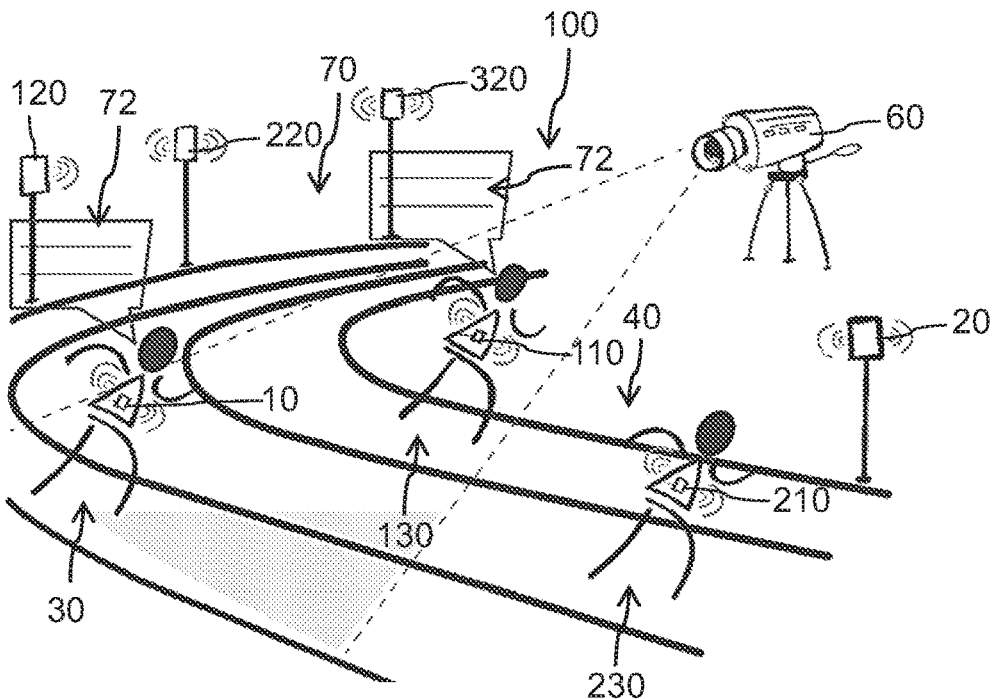

In the block diagram of FIG. 1, a system 100 for continuously tracking at least one competitor is schematically illustrated. The competitor or the competitors 30, 130, 230, as illustrated in greater detail in FIGS. 2-4, are each provided with at least one wearable transponder 10, 110, 210. The system 100 further comprises at least one wireless transmitter 20 that is operable to wirelessly submit a query. The query is provided with a timestamp. The system 100 further comprises at least three stationary receivers 120, 220, 320 that are distributed across or around the athletics track 40.

Each one of the three stationary receivers 120, 220, 320 is connected to a processing unit 50. Each one of the stationary receivers 120, 220, 320 is configured to receive a transponder specific response and to determine a runtime. The runtime is indicative of a point of time relative to the timestamp of the query at which the transponder specific response is received by the respective stationary receivers 120, 220, 320.

From different runtimes individually determined by the at least three stationary receivers 120, 220, 320 the processing unit 50 is configured to determine a position of the at least one wearable transponder 10, 110, 210 in relation to the athletics track 40 or in relation to the at least three stationary receivers 120, 220, 320. Typically, the processing unit 50 is configured to determine the momentary position of the at least one wearable transponder 10, 110, 210 by way of triangulation. With some examples, the processing unit 50 is connected with up to 8, up to 12, up to 16 or up to 20 stationary receivers 120, 220, 320, equidistantly or regularly distributed across or around the athletics track 40. By increasing the number of stationary receivers, a process again and set or reliability of the position determination as provided by the processing unit 50 can be enhanced.

Typically, the wireless transmitter 20, the at least one wearable transponder 10, 110, 210 and the at least three stationary receivers 120, 220, 320 are configured to wirelessly communicate in the Ultra Wideband (UWB) frequency range.

The processing unit 50 comprises numerous outputs 52, 54, 56 by way of which positional data generated by the processing unit 50 can be transmitted to numerous data processing means, such as a commentator system, a broadcasting system, an electronic result list, a video screen or the Internet.

The system 100 and the respective method executable by the system for obtaining real-time positional information of at least one or several wearable transponders 10, 110, 210 may operate in a quasi-continuous or continuous mode, i.e. very regularly, on a defined pace. Hence, the system may operate at a sampling rate of at least 1 Hz, at least 10 Hz, at least 20 Hz, at least 50 Hz or at least 100 Hz. Use of the UWB frequency range at a comparatively high sampling rate offers a rather precise and reliable determination of position information of numerous wearable transponders 10, 110, 210 simultaneously.

With some examples of the system 100, the wireless transmitter 20 is integrated into at least one of the three stationary receivers 120, 220, 230, which are then implemented as stationary transceivers, respectively. Then, at least one or numerous of the stationary transceivers 120, 220, 320 may be operable to wirelessly submit the query that is provided with the timestamp.

For the system and method to operate, it is only required that at least one of the three stationary transceivers 120, 220, 320 operates as the wireless transmitter 20 to generate and to submit at least a query that is provided with a timestamp. Thereafter, the at least three stationary receivers or transceivers 120, 220, 320 are operable to receive the transponder specific response for determining a respected runtime.

The wireless transmitter 20 and/or the three stationary receivers 120, 220, 320 may be also denoted as so-called anchors.

Figure 6:
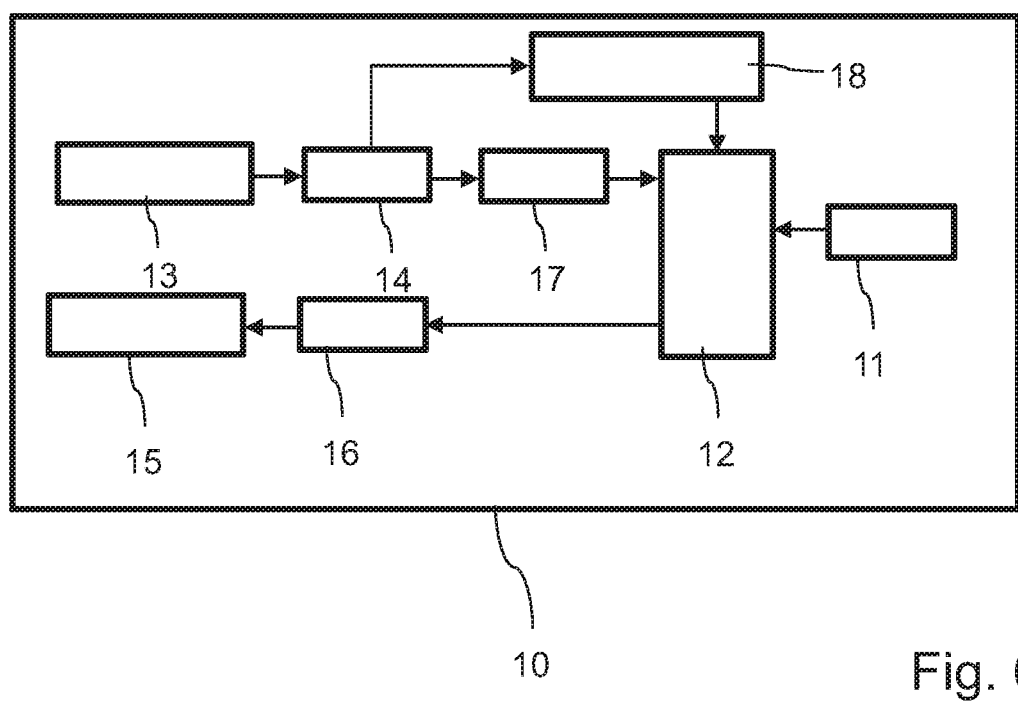
FIG. 6 shows a block diagram of an example of a wearable transponder attachable to the at least one competitor.

The at least one wearable transponder 10, 110, 210 may be denoted as transponder module or may be denoted as a wireless tag. One example of the internal structure of a wearable transponder 10 or tag is schematically illustrated in FIG. 6. The wearable transponder 10 comprises an antenna 13 configured to receive the query. The antenna 13 is connected to a signal receiver 14. The signal receiver 14 is connected to an amplifier 17 and to a power handling unit 18. A battery may form part of the power handling unit 18 or may be connected thereto. The power handling unit 18 is configured to manage the electric power supply to the electronic components of the wearable transponder 10. Typically, the power handling unit 18 is configured to operate the electric power supply as soon as a signal, e.g. a query is received by the antenna 13.

The wearable transponder 10 further comprises a transceiver 16 for the transmission of wireless signals by a further antenna 15. The wearable transponder 10 further comprises a microcontroller 12 configured to process the query received via the antenna 13, to generate a transponder specific response and to wirelessly transmit the response via the antenna 15. Optionally, the wearable transponder 10 comprises a motion sensor 11. The motion sensor 11 may be implemented as an acceleration sensor. The motion sensor 11 may be implemented as a 3G, 6G or 9G accelerometer. The motion sensor 11 can include at least one tri-axial accelerometer, one tri-axial gyroscope and/or one tri-axial magnetometer. Data signals provided by the motion sensor 11 as well as a unique and transponder specific identification are typically included in the transponder specific response.

With some examples, the wearable transponder 10 comprises only one antenna 13 or 15 configured for both, receiving and transmitting wireless signals.

Upon receipt of the transponder specific response, the respective stationary receivers 120, 220, 320 are operable to determine a runtime of a signal received from any of the available wearable transponders 10, 110, 210. Of course, the wireless transmitter 20 and the at least three stationary receivers 120, 220, 320 are mutually coupled or synchronized in order to precisely determine the respective runtimes of the responses received from the wearable transponders 10, 110, 210.

Figure 5:
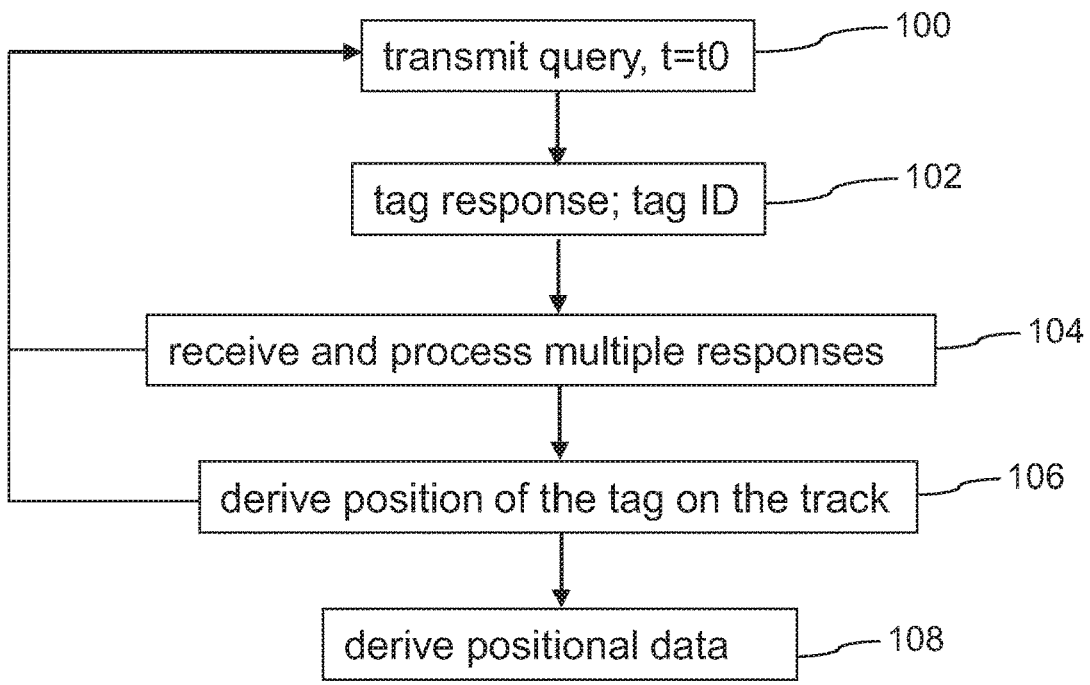
FIG. 5 shows a flowchart of the method of continuously tracking at least one competitor on the athletics track.

Accordingly and as illustrated in the flowchart of FIG. 5, in a first step 100, the wireless transmitter 20 wirelessly submits a query at a time t0 to any of the available wearable transponders 10, 110, 210, e.g. to all transponders 10, 110, 210 that are located within the area of coverage of the at least one wireless transmitter 20. With some examples, there may be provided also numerous wireless transmitters.

In a proceeding step 102, each one of the wearable transponders 10, 110, 200 generates a tag response upon receipt of the query. The tag response includes at least a unique tag identifier. The respective response is then transmitted by each of the transponders 10, 110, 210 in accordance to a predefined schedule, e.g. at a predefined time interval after receipt of the query. In the proceeding step 104, the numerous stationary receivers 120, 220, 320 individually receive a response from at least one or from at least several of the wearable transponders 10, 110, 210. Upon receipt of the responses, a runtime t1 of the respective response signal is determined by each of the stationary receivers 120, 220, 320 individually.

Here, the runtime may be indicative of the total signal path length of the query and the response. Thereafter and in step 106, the position of the wearable transponder on or along the track is determined by triangulation and by processing numerous runtimes received from different stationary receivers with respect to one and the same response transmitted by a particular wearable transponder 10, 110, 210.

Typically, the method regularly returns to step 100 after processing of steps 104 and/or 106. By repeatedly determining of a position of the wearable transponder 10, 110, 210 on or along the track in step 106, the position of the respective tag or transponder over time can be provided in step 108. In this step also further positional parameters, such as absolute or relative velocity, absolute or relative acceleration, rotation and/or a direction or movement can be determined.

Such meta data, i.e. the positional data obtained by the processing unit, can be provided in real-time to numerous output interfaces 52, 54, 56 of the processing unit 50. In this way, the meta data can be made available in real time to the Internet, to an electronic result list, to a video screen, a broadcasting station and/or to a commentator information system.

In FIGS. 1 and 4, the system 100 is further provided with a camera 60 configured to capture an image 70 of the athletics track 40. The perspective in the illustration of FIG. 4 is actually not corresponding to the view of the camera 60. For the sake of a compact illustration, the image 70 as captured by the camera 60 is illustrated in FIG. 4.

As shown in FIGS. 1 and 4, the camera 60 can be calibrated to the geometry of the athletics track 40. For this, the camera 60 can be provided with at least one sensor 62 operable to determine the direction of sight or line of sight of the camera 60. Determining and/or tracking of an orientation of the camera enables a calibration of the camera image 70 with the positional information of the wearable transponders 10, 110, 210 as provided by the processing unit 50.

Here, the processing unit 50 is configured to overlay information 72 in the image 70, which information is related to the at least one wearable transponder 10, 110, 210. The transponder is related to information 72 and in addition to athlete related information also thinkable like athlete name, nation, BIB (start number), current rank during the run, and so on.

The information 72 may be visually illustrated in a predefined region of the image 70. In this way, real-time information about position, velocity, relative position or ranking of individual transponders 10, 110, 210 and hence of individual competitors 30, 130, 230 can be visualized directly in the image 70.

With a further example, the processing unit 50 is configured to label the at least one wearable transponder 10, 110, 210 in the image 70 as such or to overlay the wearable transponder 10, 110, 210 with transponder related information 72 directly in the image. Here and as the transponder 10, 110, 210 and/or the respective competitor 30, 130, 230 is subject to a movement relative to the frame of the image 70, the respective overlay information may move together with the respective wearable transponder 10, 110, 210 or competitor 30, 130, 230. The visual information 72 tagged to a transponder 10 or competitor 30 may comprise competitor related information, such as name, nationality, position, momentary velocity and so on.

In FIG. 3, the system 100 and a respective method are operable to automatically check a transition of a movable item 32 from a first competitor 30 to a second competitor 130 within a transition zone 42, especially in a relay race.

Here, the movable item 32, e.g. in form of a batton 34 is provided with a wearable transponder 210. The position of the transition zone 42 on the track is predefined and is known to the system 100 and/or to the processing unit 50.

Now and during the competition, the momentary position and velocity of at least two competitors 30, 130 can be monitored and tracked in real-time by monitoring the respective wearable transponders 10, 110 attached to the competitors 30, 130, respectively. In addition to that the position and/or the velocity of the movable item 32, in particular the relative position of the movable item 32, e.g. of the baton 34 relative to both, the first competitor 30 and the second competitor 130 can be automatically monitored. In this way, it can be precisely monitored and determined whether a transition of the movable item 32 from the first competitor 30 to the second competitor 130 occurs in the region of the transition zone 42.

From the description that has just been given, several variants of the method of measuring at least one time or an elapsed period in a sports competition can be devised by those skilled in the art without departing from the scope of the invention defined by the claims. The transponder module can be manually activated throughout the entire duration of the sports competition. The activation and synchronisation of the transponder module time base may be achieved by the low frequency signal transmission unit.

What is claimed is:

1. A system for continuously tracking at least one competitor on an athletics track, the system comprising:
   at least one wireless transmitter operable to wirelessly submit a query and a timestamp, the query provided with the timestamp,
   at least one wearable transponder attachable to the at least one competitor, the at least one wearable transponder being configured to receive the query and the timestamp, to generate a transponder specific response and to wirelessly transmit the response,
   at least three stationary receivers distributed across or around the athletics track, wherein each one of the at least three stationary receivers is configured to receive the transponder specific response and to determine a runtime, wherein the runtime is indicative of a point in time relative to the timestamp at which the transponder specific response has been received by the respective stationary receiver, and
   a processing unit connected to the at least three stationary receivers and configured to determine a position of the at least one wearable transponder relative to the athletics track or relative to the at least three stationary receivers on the basis of the runtimes received from the at least three stationary receivers.

2. The system according to claim 1, wherein the at least one wireless transmitter is configured to generate and to submit a sequence of queries in a continuous mode.

3. The system according to claim 1, wherein the processing unit is configured to successively determine a series of positions of the at least one wearable transponder during a predefined time interval and to derive at least one of the following states of movement of the at least one wearable transponder on the basis of the series of positions: a velocity, an acceleration, a direction of movement and/or a rotation of the at least one wearable transponder by a motion sensor including a set of at least one tri-axial accelerometer and one tri-axial gyroscope and one tri-axial magnetometer.

4. The system according to claim 1, wherein the at least one wearable transponder comprises a first wearable transponder and at least one second wearable transponder, wherein the processing unit is configured to simultaneously determine a first position of the first wearable transponder and a second position of the at least one second wearable transponder on the basis of the runtimes received from the at least three stationary receivers wherein each runtime is indicative of a point in time relative to the timestamp of each wearable transponder.

5. The system according to claim 4, wherein the processing unit is configured to determine at least one of a position, an acceleration, a direction of movement and a rotation of the first wearable transponder relative to the at least one second wearable transponder.

6. The system according to claim 1, further comprising a camera connected to the processing unit and configured to capture an image of the athletics track, wherein the processing unit is configured to overlay information in the image, wherein the information is related to the at least one wearable transponder.

7. The system according to claim 6, wherein the processing unit is configured to label the at least one wearable transponder in the image and/or to overlay the at least one wearable transponder with transponder related information in the image, wherein the at least one wearable transponder and/or the respective competitor is subject to a movement relative to a frame of the image, the respective overlay information moves together with the respective wearable transponder or competitor.

8. The system according to claim 1, wherein the at least one wireless transmitter, the at least one wearable transponder and the at least three stationary receivers wirelessly communicate in the Ultra Wideband (UWB) frequency range.

9. An athletics track equipped with the system according to claim 1.

10. A method of continuously tracking at least one competitor an athletics track, the method comprising the steps of:
    attaching at least one wearable transponder to the at least one competitor,
    wirelessly submitting a query and a timestamp to the at least one wearable transponder, the query provided with the timestamp,
    receiving the query and the timestamp by the at least one wearable transponder, generating a transponder specific response based on receiving the query and the timestamp, and wirelessly transmitting the transponder specific response,
    receiving the transponder specific response by at least three stationary receivers distributed across or around the athletics track and determining a runtime, wherein the runtime is indicative of a point in time relative to the timestamp at which the transponder specific response has been received by the respective stationary receiver,
    determining a position of the at least one wearable transponder relative to the athletics track or relative to the at least three stationary receivers on the basis of the runtimes received from the at least three stationary receivers.

11. The method of claim 10, further comprising the steps of submitting a sequence of queries in a continuous mode and updating the position of the at least one wearable transponder at a sampling rate of at least 1 Hz, at least 10 Hz, at least 20 Hz, at least 50 Hz or at least 100 Hz.

12. The method of claim 10, wherein determining the position of the at least one wearable transponder comprises determining a first position of a first wearable transponder and simultaneously determining a second position of at least one second wearable transponder on the basis of the runtimes received from the at least three stationary receivers wherein each runtime is indicative of a point in time relative to the timestamp of each wearable transponder.

13. The method of claim 12, further comprising the step of determining at least one of a position, an acceleration, a direction of movement and a rotation of the first wearable transponder relative to the at least one second wearable transponder.

14. The method of claim 10, further comprising the step of capturing an image of the athletics track and overlaying information in the image, wherein the information is related to the at least one wearable transponder.

15. A non-transitory computer-readable medium storing a computer program that is configured to, when executed by a processing unit of a system for continuously tracking at least one competitor on an athletics track, cause the processing unit to:
    determine a position of at least one wearable transponder relative to the athletics track or relative to at least three stationary receivers on a basis of runtimes received from the at least three stationary receivers, wherein the system includes at least one wearable transponder that is attachable to the at least one competitor,
wherein the at least one wearable transponder is operable to generate a transponder specific response and to transmit the response to at least three stationary receivers in response to wirelessly receiving a query that is provided with a timestamp,
wherein the at least three stationary receivers are distributed across or around the athletics track and wherein each of the at least three stationary receivers is configured to wirelessly receive the transponder specific response and to determine a runtime, wherein the runtime is indicative of a point in time relative to the timestamp at which the transponder specific response has been received by a respective one of the at least three stationary receivers,
wherein the system further includes a camera connected to the processing unit and configured to capture an image of the athletics track, and
wherein the computer program is further configured to, when executed by the processing unit, cause the processing unit to overlay information in the image, wherein the information is related to the at least one wearable transponder.

* * * * *